United States Patent Office 3,749,684
Patented July 31, 1973

3,749,684
RESINS WITH TERTIARY AMINE OXIDE
FUNCTIONALITY
Robert Winn Walker, 6008 Cannon Hill Road,
Fort Washington, Pa. 19034
No Drawing. Continuation of abandoned application Ser.
No. 851,456, Aug. 19, 1969. This application July 15,
1971, Ser. No. 163,094
Int. Cl. C08f 27/22, 19/20
U.S. Cl. 260—2.1 E                                18 Claims

ABSTRACT OF THE DISCLOSURE

Resins containing aliphatic or non-heterocyclic aromatic tertiary amine groups which have been converted to the corresponding tertiary amine oxide groups exhibit little or no volume change during acid and base cycling operations and have much greater physical stability. The amine oxide containing resins are useful as weakly basic anion exchange resins and as adsorbents for removing polar compounds from non-polar compounds.

---

This is continuation of application Ser. No. 851,456, filed Aug. 19, 1969, now abandoned.

This invention relates to novel resins which are useful as adsorbents and as weakly basic ion-exchange resins.

When conventional anion exchange resins are converted during use from their basic to their acidic form, they undergo a significant volume change, or swelling. During regeneration, the resins are changed from their acidic to their basic forms, thus going through the original volume change in reverse. After several of these base-to-acid-to-base cycles, the repeated changes in volume of the ion-exchange beads cause them to fragment or crack, leading to a diminishing of their usefulness, and in particular their ion-exchange and adsorbent usefulness. Therefore, it would be desirable to have an ion-exchange resin which would be subject to little or no volume change during use and consequently would show greater resistance to physical breakdown. In J. Chem. Soc. 1963, 1519, and in Israeli Pat. 14,445/1960, Heller et al., describe N-oxides of certain polyvinyl pyridine resins. However, when used as anion exchangers, these polymers showed a large volume change in different ionic forms, an acknowledged disadvantage for many operations.

It has now been found that when at least about 5% of the tertiary amine groups of certain polymeric resins containing tertiary amine functionality are converted to the corresponding tertiary amine oxide groups, there is very little or no volume change during acid and base cycling operations, and that beads of such amine oxide containing resins have much greater physical stability.

According to the invention, resins which are subject to little or no volume change during use and which show greater resistance to physical deterioration have a cross-linked polymeric resin matrix or backbone with a plurality of nitrogen-containing functional groups wherein at least about 5% and up to 100% of these functional groups are tertiary amine oxide groups and the remainder of these functional groups are tertiary amine groups. Of course, the resins can also have nitrogen-containing groups other than tertiary amine and tertiary amine oxide groups, such as amido, nitro, or cyano groups. As described below, the percentage of amine oxide groups can easily be varied between about 5% and 100%, and that degree of conversion to amine oxide functionality can be chosen which will give the best results in a specific application.

Any aliphatic or non-heterocyclic aromatic tertiary amine group which can be converted to a tertiary amine oxide group will be a suitable substituent from which the resins of the invention can be made. The tertiary amine oxide groups in the resins of the invention will generally have the formula

(I)

wherein R and R' are the same or different alkyl, aryl, alkaryl or aralkyl groups, or wherein R and R' can be taken together to form a saturated heterocyclic ring with the attached nitrogen atom or can be joined with an R or R' group in another nitrogen-containing functional group through an alkylene or alkylene-amino chain. The tertiary amine groups will generally have the formula

(II)

wherein R and R' are as defined above.

Among the groups which R and R' can represent are methyl, ethyl, propyl, hexyl, cyclohexyl, dodecyl, phenyl, benzyl, p-methylbenzyl, and the like. Among the heterocyclic groups which R and R' can be taken together to form are pyrrolidinyl, piperidino, morpholino, and the like.

A wide variety of polymeric resin matrices is useful in making the novel amine oxide-containing resins of the present invention, and any polymeric resin having tertiary amine functional groups can be used. Such resins include both macroreticular and gel type resins, as well as a wide variety of condensate resins. All of the resins used in making the amine oxide-containing resins of the invention are known and are available from a number of sources.

The macroreticular and gel type resins containing tertiary amine groups have been widely described in the prior art. In general, similar types of monomeric materials are used in preparing both the macroreticular and gel type resins, while the preparation process is varied to impart different characteristics, especially different porosity, to the two types of resins. When macroreticular or gel type resins are used to prepare the resins of the invention, the nature of the polymer which comprises the backbone of the resin is unimportant, the only requirement being that the resin ultimately contain tertiary amine groups which can be converted to tertiary amine oxide groups. However, in general, the backbone of these resins will be a cross-linked copolymer of (1) a polyunsaturated monomer, containing a plurality of non-conjugated $CH_2=C<$ groups, which acts as a cross-linking agent and (2) a monoethylenically unsaturated monomer.

Suitable polyunsaturated cross-linking agents include divinylbenzene, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polyvinyl ethers of glycol glycerol, pentaerythritol, resorcinol and the monothio or dithio derivatives of glycols.

Preferred cross-linking monomers include polyvinyl aromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane. The amount of cross-linking agent can be varied widely but since the total utilizable capacity of the final resin as an anion-exchange resin decreases with an increase in the amount of cross-linking agent, an amount of about 2% to about 20%, and preferably about 3 to 10%, on a molar basis is usually adequate.

Suitable monoethylenically unsaturated monomers include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, vinyl naphthalene, vinyl-toluene and vinylnaphthalene. A class of monomers of particular interest consists of styrene and the esters of acrylic and methacrylic acid with a $C_1$–$C_{10}$ aliphatic alcohol.

The polymerization reaction is generally carried out in the presence of a catalyst. Suitable catalyst which provide free radicals to function as reaction initiators include benzoyl peroxide, t-butyl hydroperoxide, cumene hydroperoxide, tetralin peroxide, acetyl peroxide, caproyl peroxide, t-butyl perbenzoate, t-butyl diperphthalate, methyl ethyl ketone peroxide.

The amount of peroxide catalyst required is roughly proportional to the concentration of the mixture of monomers. The usual range of 0.01% to 5% of catalyst with reference to the weight of the monomer mixture. The optimum amount of catalyst is determined in large part by the nature of the particular monomers selected, including the nature of the impurities which may accompany the monomers.

Another suitable class of free radical generating compounds which can be used as catalysts are the azo catalysts, including for example, azodiisobutyronitrile, azodiisobutyramide, azobis($\alpha,\alpha$ - dimethylvaleronitrile), azobis ($\alpha$-methylbutyronitrile), dimethyl, diethyl, or dibutyl azobis(methylvalerate). These and other similar azo compounds, which serve as free radical initiators, contain an —N=N— group attached to aliphatic carbon atoms, at least one of which is tertiary. An amount of 0.01% to 2% of the weight of monomer or monomers is usually sufficient.

In making the gel type resins, a wide variety of polymerization processes well known in the art can be used. However, the preferred method is emulsion or suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing the macroreticular resins, the polymerization reaction is carried out in the presence of the precipitant which is a liquid (a) which acts as a solvent for the monomer mixture and is chemically inert under the polymerization conditions and (b) which is present in such amount and which exerts so little solvating action on the product cross-linked copolymer that phase separation of the product copolymer takes place as evidenced by the fact that the product copolymer is no more than semi-transparent and is preferably opaque when associated with a fluid having a different refractive index.

The determination of the most effective precipitant and the amounts required for the formation of a particular copolymer may vary from case to case because of the numerous factors involved. However, although there is no "universal" or single class of precipitants applicable to all cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks.

Cross-linked copolymers are generally insoluble, but, depending upon the degree of cross-linkage, they can be swollen by liquids which might be considered as being good "solvents" and if the product crosslinked copolymer is so solvated by a liquid that it undergoes swelling then the liquid in question is unsuitabile as a precipitant.

As a further guide in the selection of a suitable precipitant, reference may be made to scientific literature, for instance, as discussed in Hildebrand and Scott, Solubility of Non-Electrolytes, 3d ed., New York, 1950. In general, it may be stated that sufficiently wide differences in the solubility parameters of copolymers and solvent, respectively, must exist for the precipitant to be effective and that, once an effective precipitant has been located, the behaviour of many other liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogenous when some components are present in only mnor amounts; but, if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 25 percent and 60 percent of the total weight of the monomer mixture and the precipitant.

The amount of precipitant liquid required to effect phase separation varies inversely with the degree of crosslinking of the copolymer so that the greater the crosslinker content the lesser is the amount of precipitant employed.

As stated above, the chemical character of the precipitant may vary appreciably, depending on the monomer mixture which is used. When employing aromatic hydrocarbon type monomers, such as, for instance, styrene and divinylbenzene, alkanols with a carbon atom content of from 4 to 10 will, if sufficient crosslinker is used, effect the desired phase separation when used in amounts of from 30% to 50% of the total weight of monomers and precipitant.

Saturated aliphatic hydrocarbons containing at least 7 carbon atoms, such as heptane and isooctane, may be employed as precipitants for aromatic hydrocarbon systems, such as styrene and divinylbenzene. The amounts employed can be varied, depending on the degree of crosslinkage, from 30% to 50% of the total weight of the monomers and precipitant.

When employing acrylic esters as the monounsaturated monomers, alkyl esters can be effectively employed as precipitants. Typical esters include n-hexyl acetate, 2-ethylhexyl acetate, methyl oleate, dibutyl sebacate, dibutyl adipate and dibutyl carbonate. The esters must have a carbon atom content of at least 7. The concentrations required will vary somewhat with the ester being used and with the amount of cross-linking monomer but from 30% to 50% based on the combined weight of the monomers and the precipitant will generally cause the desired phase separation and the formation of a macroreticular structure within the polymerized mass.

Higher aliphatic hydrocarbons containing at least 7 carbon atoms, such as heptane and isooctane, may be employed as precipitants when employing acrylic esters as the monoethylenically unsaturated monomers. The amounts employed can be varied from 25% to 50% based on the combined weight of monomers and precipitant.

Many polymerization methods can be used in preparing these macroreticular resins. The preferred method, however, is suspension polymerization. In this case, an additional factor must be considered, namely, the solubility, i.e., miscibility, of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low water-solubility is preferred because of handling ease, ease of recovery, and processing economies. As is well known, however, it is possible to decrease the water-solubilities of compounds by adding salts to the aqueous phase and this method also may be employed to decrease the water-solubilities of a precipitant liquid. The general position is that, when suspension polymerization is used, the precipitant must be either immiscible or only partially miscible with the suspending medium.

Other suitable methods for preparation of the macroreticular resins are disclosed in U.S. Pats. 3,275,548 and 3,357,158.

The process by which the tertiary amine groups are introduced into the resin matrices will vary according to the type of polymer in the backbone of the resin. For example, when styrene or another aromatic monovinyl monomer is employed in making the resin backbone, halomethylation of the resin followed by reaction with a secondary amine will introduce tertiary amine groups into the resin, and when the backbone is an acrylic or a methacrylic ester, reaction of the resin with a compound having both a primary amine group and a tertiary amine group will produce a resin with tertiary amine functionality. When a glycidyl ester of acrylic or methacrylic acid is used, the tertiary amine functionality can be introduced by direct reaction of the resin with a secondary amine.

The halomethylation reaction involves introducing into the polymer a plurality of bromoalkyl or, preferably, chloroalkyl groups. These groups will have the general formula $-C_nH_{2n}-X$, where $n$ is an integer of 1 to 4. While groups containing one to four carbon atoms can be used, it is preferred to employ those compounds in which chloromethyl groups, $-CH_2Cl$, are added to the insoluble polymer, because the chloromethyl products are by far the most reactive. The carbon atoms in the group $-C_nH_{2n}-X$ may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst.

The preferred procedure is to treat the particles of polymer with chloromethyl ether and a Friedel-Crafts catalyst. During the step of halomethylating, some cross-linking of the polymer by the halomethylating agent can take place.

When the polymer being treated is already cross-linked and is completely insoluble, the particles thereof may be immersed in the chloromethyl ether until they swell, after which the Friedel-Crafts condensing agent is added. This soaking and swelling of the particles of polymer facilitates the chloromethylation reaction within the pores of the particles when the Friedel-Crafts catalyst is added.

When the polymer being treated is linear, as in the case of polystyrene per se, or is cross-linked to only a slight extent as, for example, by the use of about 0.1% of a divinyl cross-linker, the treatment with the halomethylating agent, particularly chloromethyl ether, results in cross-linking and insolubilization of the polymer as well as in halomethylation thereof. In such instances methylene bridges link the molecules of polymer together. In the preferred process of simultaneously cross-linking and chloromethylating, the chloromethyl ether and the Friedel-Crafts condensing agent are first mixed and the particles of aromatic hydrocarbon polymer, such as polystyrene, are then added to or treated with this mixture. Linear polymers, such as polystyrene, soften rapidly and dissolve in chloromethyl ether alone; but, when the Friedel-Crafts catalyst is present, the cross-linking and insolubilization of the polymer occurs so rapidly that the polystyrene particles are prevented from dissolving or softening and coalescing. Polystyrene, when treated in this fashion, has all the properties of an insoluble, infusible, cross-linked polymer and, in fact, appears to be more highly cross-linked than a similarly treated polystyrene polymer which had been previously cross-linked with 1% divinyl benzene, but it does not appear to be as highly cross-linked as a chloromethylated copolymer of polystyrene cross-linked with 6% divinyl benzene.

The extent of the halomethylation reaction is conveniently determined by a halogen analysis. It is desirable that as many halomethyl groups as possible be introduced into the insoluble copolymer because the number of such groups determines the number of polar groups that can be introduced into the final product; and the number of such polar groups determines the capacity of the resin to adsorb ions.

The next step in the preparation of the tertiary amine containing resins is the amination of the haloalkylated copolymer with a secondary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing amino groups, is freed from the liquid.

It has been found to be advantageous to swell the haloalkylated polymer prior to its reaction with the amine. This swelling facilitates the subsequent amination reaction and may be carried out by soaking the polymer in a suitable liquid. The most common liquids for this purpose include aromatic hydrocarbons such as benzene and toluene. Frequently, the volume of the polymer will increase as much as 100%, although the amount of swelling depends to a great extent upon the amount of cross-linking which has taken place during the preparation of the original polymer. In general, the amount of swelling is inversely proportional to the degree of cross-linking.

The amines which are employed are used in the form of the free base. The prime requirement is that they contain at least one amino-nitrogen atom to which is attached one reactive hydrogen atom. The amines which are preferred in this application are those in which the amine group or groups are attached to a hydrocarbon group. Other amines may be used, however, including those wherein the hydrocarbon group of the amine carries a substituent group. Such amines may be exemplified by diethanolamine. For best results, the amino compound should not contain substituent groups which are themselves reactive under the conditions employed in aminating the haloalkylated resin.

The hydrocarbon portion of the amine can be alkyl, aryl, cycloalkyl, aralkyl, or alkaryl. The following typify the amines which are suitable in this invention when used individually or in mixtures with one another: dimethylamine, dibutylamines, dibenzylamine, benzyl aniline, benzyl ethylamine, methyl aniline, dicyclohexylamine, and diethanolamine.

Weak base resins are also prepared by reacting esters with amines to form amide linkages. The reaction will generally be carried out at a pot temperature above 140° C. Temperatures as high as the boiling point of the amino compound or up to depolymerization temperature of the polyester can be used. While the optimal reaction temperature will depend on the particular amine which is used, the overall range of operable temperatures is usually about 140–250° C.

In a satisfactory procedure a large excess of the liquid amino compound is employed so that the reaction mixture is fluid at all times and can be easily stirred. The reaction between the particles of resin and the amino compound progresses more smoothly if it is conducted under substantially anhydrous conditions. The chemical reaction involved at this point is one of aminolysis. Primary amino groups of the polyamino compounds react with the ester groups of the polyesters and as a result molecules of alcohol are liberated. The alcohol vaporizes and is separated and recovered from the reaction mixture by distillation. Measurement of the amount of liberated alcohol provides a convenient means of following the progress of the reaction.

At the end of the reaction the mixture in the reactor is treated with water. The mixture can be poured into water; but it is much more advantageous to add water slowly to the contents of the reactor. The latter method is much preferred because it does not cause shattering or spalling of the spheroidal particles of the resinous product. The beads of resin are then removed from the mixture of water and unreacted amine and are thoroughly washed with water and/or an alcohol such as methanol or ethanol. The resin is now in a suitable form for use in adsorbing anions from fluids. In commercial production, however, it is recommended that particles of resin be given a thorough washing with dilute mineral acid; e.g., hydrochloric acid, in order to convert them into the salt form, followed by a thorough washing with sodium hydroxide in order to regenerate them completely to the form of the free base. The excess amino compound is freed of water and is recovered by distillation.

The amino compounds used to react with the cross-linked esters must contain at least two amino groups, at least one of which is a primary amino group, and one tertiary. The primary amino groups react with the ester groups in the cross-linked copolymer to form amido groups. Useful amino compounds include N-aminopropylmorpholine, N-aminoethylmorpholine, N-aminoethylpiperidine, N-aminoethylpyrrolidine, dimethylaminopropylamine, dimethylaminoethylamine, diethylaminopropylamine, and the like.

Among the condensate resins which are useful in making the amine oxide containing resins of the invention are those made by condensing an epihalohydrin, such as epichlorohydrin, with a polyalkylene-polyamine, such as diethylenetriamine, triethylenetetramine, tetraethylenepentamine, iminobispropylamine and the like. One of the various useful processes for carrying out the condensation involves preparing an initial, partial condensate, or precondensate syrup, of an epihalohydrin and an aqueous solution of a polyalkylenepolyamine. Polymerization is permitted to proceed only to the point where a somewhat viscous syrup is produced. The partially condensed, slightly viscous material is then added, with agitation, to a hot, inert, organic, non-solvent liquid containing a small amount of a surface active agent which tends to prevent or minimize the agglomeration or fusion of the desired globules or spheroidal particles which are formed as a result or rapidly stirring or agitating the mixture. The rate of agitation is predetermined to produce a desired particle size. The reaction mixture is heated, with agitation, until solid resin beads are formed as a result of further polymerization. The temperature of the mixture is increased to remove as much of the water contained in the precondensate syrup in the form of an azeotropic mixture with the organic, non-solvent liquid. Heating is then continued to permit the complete polymerization of the resin condensate. The non-solvent can then be drained from the spheroids or beads.

Other methods and variations for making suitable condensate resins are disclosed in U.S. Pats. 2,898,309 and 3,005,786.

Any other polymeric resin matrix containing aliphatic or non-heterocyclic aromatic tertiary amine groups which can be converted to their tertiary amine oxide form can also be used in making the resins of the invention.

The tertiary amine groups in the various resin matrices are easily converted to their respective tertiary amine oxides by reacting them with aqueous hydrogen peroxide. In general, the degree of conversion, that is, the percentage of tertiary amine groups converted to tertiary amine oxide groups, can be controlled by varying the reaction time, the reaction temperature, the amount of hydrogen peroxide used, or other parameters. In general, if complete or almost complete conversion to amine oxide functionality is desired, a reaction time of about 144 hours at a temperature of about 25° C. to 30° C., using about 3 moles of hydrogen peroxide for each mole of tertiary amino groups, will generally be sufficient to effect the conversion. Of course, using a shorter reaction time or a lesser amount of hydrogen peroxide will give a lower degree of conversion of tertiary amine groups to tertiary amine oxide groups.

To determine the degree of conversion to amine oxide functionality, any of a wide variety of known analytical procedures can be employed. Among the physical methods which can be utilized are the determnation of the amount of oxygen liberated during the conversion reaction and an infrared spectral technique in which the ratio of the band attributable to the amine oxide functional group to the band attributable to another functional group in the resin, such as an aromatic band in a styrene-backboned resin, is measured and compared to the same ratio in a 100% amine oxide-converted resin. Among the chemical methods which can be utilized are a two-step acid-base titrimetric procedure, in which a first titration of both the tertiary amine and tertiary amine oxide groups is carried out, and after quaternization of the free tertiary amine groups with methyl iodide, a second titration is carried out. A second method involves an iodometric titration, using potassium iodide and sodium thiosulfate, in glacial acetic acid, in which the amine oxide content is determined directly. The latter two techniques are described in Anal. Chem., 34, 1849 (1962) and J. Prakt Chem. (4 Reihe), 19, 260–265, respectively. Other appropriate analytical techniques can also be used.

All of the resins of the present invention are useful as weakly basic anion-exchange resins. When used as ion-exchange resins, the resins of the invention show unexpected greatly enhanced physical stability, that is, resistance to cracking, fragmenting, or other physical deterioration, without significant loss in exchange capacity. Furthermore, these resins are also quite useful as adsorbents, and particularly in removing polar compounds from non-polar compounds. For example, the resins of the invention are useful in adsorbing aliphatic alcohols or phenolic compounds from organic solvents. In addition to showing increased physical stability as adsorbents, the resins of the invention also have a greater capacity in adsorption applications than corresponding resins in their tertiary amine form.

The following examples will further illustrate this invention but are not intended to limit it in any way.

EXAMPLE 1

To a one-liter three-neck flask filled with a stirrer, thermometer, and gas outlet tube were added 1.0 moles of a macroreticular, weak base anion-exchange resin containing tertiary amine functionality on a styrene-divinylbenzene matrix, 3.0 moles of 30% hydrogen peroxide, and 150 ml. of deionized water. The system was sealed and the gas liberated was collected by water displacement from an inverted graduated cylinder. The resulting slurry was stirred at room temperature for six days. The reaction mixture can be cooled slightly for the first hour to maintain a reaction temperature of less than 30° C., if desired.

The reaction mixture was then transferred to a graduated cylinder and backwashed with deionized water until the washings did not liberate iodine from an acidified acetic acid 20% aqueous sodium iodide solution. The resin was filtered and bottled moist.

The resin produced by the above procedure was 100% converted to the amine oxide form, and had the following characteristics:

|  |  | Unconverted resin |
| --- | --- | --- |
| Weak base capacity, meq./g | 3.68 | 4.02 |
| Strong base capacity, meq./g | 0.55 | 0.21 |
| Anion exchange capacity, meq./g | 4.23 | 4.23 |
| Solids, percent | 34.6 | 41.4 |

EXAMPLE 2

Following the procedure of Example 1, 100 g. of a gel type, weakly basic anion exchange resin possessing tertiary amine functionality in a crosslinked acrylic matrix, 120 g. of 30% hydrogen peroxide, and 150 ml. of deionized water were stirred at room temperature for three days. Cooling was necessary during the initial reaction period and some effervescence was noted at this time.

After the reaction was complete, the resin was washed and filtered.

The resin produced by the above procedure had the following characteristics:

|  |  | Unconverted resin |
| --- | --- | --- |
| Anion exchange capacity, meq./g | 6.00 | 6.13 |
| Solids, percent | 32.4 | 43.5 |

EXAMPLE 3

Following the procedure of Example 1, using the same resin as starting material, several amine oxide-containing resins were prepared, containing less than 100% conversion of the tertiary amine groups to tertiary amine oxide groups. Table I summarizes the characteristics of the various resins so prepared.

TABLE I

| Ex. No. | Moles starting resin | Moles $H_2O_2$ | Time (hrs.) | Percent conversion to amine oxide [1] | Weak base capacity (meq./g.) | Strong base capacity (meq./g.) | Anion exchange capacity (meq./g.) | Percent solids |
| --- | --- | --- | --- | --- | --- | --- | --- | --- |
| 3a | 0.5 | 0.07 | 7.5 | 7.5 | 3.94 | 0.21 | 4.23 | 41.4 |
| 3b | 1.0 | 0.25 | 24 | 14.5 | 3.78 | 0.73 | 4.51 | 39.3 |
| 3c | 1.0 | 0.50 | 24 | 25 | 3.80 | 0.63 | 4.43 | 38.2 |
| 3d | 1.0 | 1.00 | 24 | 45 | 3.75 | 0.53 | 4.28 | 36.4 |
| 3e | 1.0 | 1.50 | 24 | 65 | 3.63 | 0.54 | 4.17 | 35.1 |

[1] Calculated from $O_2$ liberated.

EXAMPLE 4

50 g. (33.5% solids; 0.5 mole) of an epichlorohydrin-triethylenetetramine condensate ion exchange resin and 11.3 g. (0.1 mole) of a 30% hydrogen peroxide solution were charged to a reaction vessel equipped with mechanical stirrer, thermometer and a take-off line extending to an inverted graduate cylinder for measuring oxygen evolution. The temperature rose slowly to 32° C. and the mixture was stirred overnight. The resin beads were filtered and the supernatant liquid gave a negative test for residual peroxide with potassium iodide and starch solution. Essentially no oxygen was collected in the graduate cylinder. The resin was backwashed to remove any fines.

The resin produced by the above procedure was approximated 25% converted to the amine oxide form, and had the following characteristics:

|  |  | Unconverted resin |
| --- | --- | --- |
| Weak base capacity, meq./g | 10.39 | 11.11 |
| Strong base capacity, meq./g | 0.11 | 0.10 |
| Anion exchange capacity, meq./g | 10.50 | 11.21 |
| Solids, percent | 32.4 | 33.5 |

When an excess of hydrogen peroxide is used complete conversion to the amine oxide can be obtained.

EXAMPLE 5

Physical stability towards acid shock

The following procedure was used to evaluate the stability of various amine oxide-containing resins and their untreated counterparts.

A few hundred beads of a suitable uniform size (usually a 20/30 mesh screen cut) of the resin are placed in a 250 ml. beaker. Approximately 200 ml. of 10% aqueous acetic acid are added and the resulting slurry is stirred briefly about every five minutes. After about fifteen minutes of contact with the acid, the resin is transferred onto a small 325 mesh screen and thoroughly rinsed with deionized water. The resin is then returned to the beaker using as little water as possible (no more than 20 ml.) and approximately 200 ml. of 4% aqueous sodium hydroxide are added. The resin is left in contact with the sodium hydroxide solution for about 15 minutes with brief stirring every five minutes, and then rinsed with deionized water as above. The entire acid-base cycle is carried out four times and, after the final rinsing, the beads are examined microscopically to determine the extent of physical deterioration.

Table II summarizes the stability, as measured by the above procedure, of the amine oxide containing resins of the invention, and shows a comparison of the stability of the converted and the unconverted resins.

TABLE II

| Resin—Example No. | Percent perfect | Percent broken | Unconverted resin Percent perfect | Unconverted resin Percent broken |
| --- | --- | --- | --- | --- |
| 1 | 97.7 | 2.3 | 72 | 28 |
| 3a | 88.5 | 11.5 | 72 | 28 |
| 3c | 97.4 | 2.6 | 72 | 28 |
| 3d | 97.6 | 2.4 | 72 | 28 |
| 3e | 97.4 | 2.6 | 72 | 28 |
| 4 | 94 | 6 | 72 | 23 |

The above data demonstrates the great increase in stability for those resins which contain tertiary amine oxide functionality.

EXAMPLE 6

Deacidification of glyoxal

In order to evaluate the amine oxide containing resins as ion exchange resins and to confirm the physical stability of such resins in an actual use application, a microcycling technique was used by which a tertiary amine containing resin and a similar resin containing tertiary amine oxide groups were exposed to sorptions and desorptions of weak and strong acids in a sequence similar to that in field operation of deacidification of glyoxal. The composition of the industrial glyoxal solution under consideration for treatment by ion exchange means is as follows: (1) 15% aqueous solution of glyoxal, (2) 0.75% $HNO_3$, (3) 0.75% acetic acid, (4) unknown quantity of a colored acid which apparently is indigenous to the glyoxal. It is apparent that in the operation of a weakly basic resin upon this acid mixture, the weak acids will form at least one distinct exhaustion band which will precede the nitric acid exhaustion band. In essence, the phase sequence through the resin will be as follows: (1) weak acids with the weaker ones preceding the stronger ones, (2) displacement of the weak acids by nitric acid, (3) regeneration of all the functionality to the free amine.

To simulate this sequence using a micro-cycler, a three phase system was set up as follows: (1) 2.25% acetic acid in an aqueous solution of 15% glyoxal, (2) 2.25% $HNO_3$ in an aqueous solution of 15% glyoxal, (3) 1 N ammonia. The total cycle time is 1 hour. The higher concentrations of acids were used in order to ensure complete conversion of the resins in the micro-cycle.

The resins which were evaluated by this technique were (A) a macroreticular, weak base base anion exchange resin containing tertiary amine functionality on a styrene-divinyl-benzene matrix and (B) a resin in which about 25% of the tertiary amine groups in resin A were converted to amine oxide groups. After 155 microcycles, beads of the two resins were examined for physical deterioration. Among the beads of resin A, only about 66% remained undamaged, while among the beads of resin B, about 97% remained undamaged, thus confirming the physical stability of the amine oxide group containing resins in an actual ion exchange application. This test also showed that resin B was effective in separating the acids from the glyoxal mixture.

EXAMPLE 7

Adsorption of phenol from hexane

In order to demonstrate the usefulness of the amine oxide containing resins of the invention for the adsorption of phenol from hexane, equilibrium experiments were performed using a solution of 2.71 millimoles/liter of phenol in hexane and two resins—a resin prepared in accordance with Example 1 with 100% conversion to amine oxide form and the same resin in its unconverted form. Fifty milliliters of the phenol solution were equilibrated with a weighed quantity of resin for at least a week. After equilibration, the optical densities of the samples were measured at a wave length of 271 m$\mu$. on a Beckman-DU. The results obtained using each of the resins are summarized in Table III.

TABLE III

| | Phenol adsorbed (mmole/g. .10²) | Equilibrium concentration (mmole/l.) |
|---|---|---|
| Unconverted resin | 63 | 0.905 |
| Amine oxide containing resin | 119 | 0.130 |

The above data demonstrates the effectiveness and advantageousness over the corresponding unconverted resins of the amine oxide containing resins in adsorbing phenol from hexane.

EXAMPLE 8

Adsorption of octyl alcohol from benzene

In order to demonstrate the usefulness of the amine oxide containing resins of the invention for the adsorption of octyl alcohol from benzene, equilibrium experiments were performed using a solution of 10.9 millimoles/liter of octyl alcohol in benzene and the same two resins evaluated in Example 7. Fifty milliliters of the octyl alcohol-benzene solution were equilibrated with the weighed quantity of resin for at least a week. The equilibrium concentrations were determined using gas chromatography. The results obtained using each of the resins are summarized in Table IV.

TABLE IV

| | Octyl alcohol adsorbed (mmole/g. .10²) | Equilibrium concentration (mmole/l.) |
|---|---|---|
| Unconverted resin | 7.0 | 10.2 |
| Amine oxide containing resin | 12.0 | 9.6 |

The above data demonstrates the effectiveness and advantageousness over the corresponding unconverted resins of the amine oxide containing resins in adsorbing octyl alcohol from benzene.

EXAMPLE 9

Adsorption of phenol from benzene

In order to demonstrate the usefulness of the amine oxide containing resins of the invention for the adsorption of phenol from benzene, column experiments were performed using as a loading solution 500 p.p.m. of phenol in benzene and the same two resins evaluated in Example 7. The volume of adsorbent used was 10 ml. (swollen in benzene) for each column. A flow rate of 0.5 gal./ft.³/min. (4 BV/hr.) was maintained throughout the experiments. The analytical method used was spectrophotometric determination using benzene as reference at a wave length of 278 m$\mu$. The amine oxide containing resin had a capacity of 28 bed volumes to 0.5% leakage as compared to 18 bed volumes for the unconverted resin. Excellent regeneration was obtained using 0.5% sodium hydroxide in methanol.

The above tests demonstrate the effectiveness and advantageousness over the corresponding unconverted resins of the amine oxide containing resins in adsorbing phenol from benzene.

EXAMPLE 10

Deacidification of formaldehyde

To evaluate the amine oxide containing resins in the deacidification of formaldehyde, cycling studies were performed using a 50% aqueous solution of formaldehyde containing 0.5% formic acid. The tests were run at 160° F., the normal temperature employed in the field for this operation.

The resins which were evaluated were (A) a macroreticular weak base anion exchange resin containing tertiary amine functionality on a styrene-divinylbenzene matrix and (B) a resin in which about 25% of the tertiary amine group in resin A were converted to amine oxide groups. After 11 cycles beads of the two resins were examined for physical deterioration. Among the beads of resin A only about 63% remained undamaged, while among the beads of resin B about 97% remained undamaged, thus confirming the physical stability of the amine oxide group containing resin in this type of application. The test also showed that resin B was effective in removing formic acid from formaldehyde.

EXAMPLE 11

Ion exchange treatment of water containing high total dissolved solids

Water containing high concentrations of dissolved inorganic solids often cause physical breakdown when a bed containing weak base resins is used for deionization following a cation exchange bed. To evaluate amine oxide containing resins in this application, a microcycling study was run alternating between exhaustion with a 0.25 N acid solution, consisting of approximately equal parts of hydrochloric acid and sulfuric acid, and regeneration with 1 N sodium hydroxide. After 500 cycles a styrene-divinylbenzene resin with about 25% of the tertiary amine groups in the amine oxide form had over 99% perfect beads. This physical stability is exceptionally good for a weak base ion exchange resin used for this application.

I claim:

1. A cross-linked ion-exchange or adsorbent polymeric resin matrix having a plurality of functional groups selected from aliphatic or non-heterocyclic aromatic tertiary amine oxide groups and aliphatic or non-heterocyclic aromatic teritary amine groups, wherein at least about 5% to 100% of said functional groups are tertiary amine oxide groups, and wherein said tertiary amine oxide groups have the formula

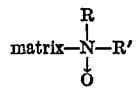

wherein R and R' are the same or different alkyl, aryl, alkaryl, or aralkyl groups, or wherein R and R' can be taken together to form a saturated heterocyclic ring with the attached nitrogen atom, or wherein R or R' can be joined with an R or R' in another tertiary amine oxide or tertiary amine group through an alkylene or alkyleneamino chain, and wherein said tertiary amine groups have the formula

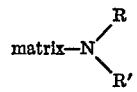

wherein R and and R', are as defined above.

2. A resin according to claim 1 wherein the resin is a gel type resin.

3. A resin according to claim 1 wherein the resin is a macroreticular resin.

4. A resin according to claim 1 wherein the matrix is a styrene-divinylbenzene matrix.

5. A resin according to claim 1 wherein the matrix is a cross-linked acrylic matrix.

6. A resin according to claim 1 wherein the matrix is a epichlorohydrin-polyalkylenepolyamine condensate.

7. A resin according to claim 1 wherein about 7.5% to about 65% of said functional groups are tertiary amine oxide groups.

8. A resin according to claim 1 wherein about 25% of said functional groups are tertiary amine oxide groups.

9. A resin according to claim 1 wherein the polymeric resin matrix is cross-linked with about 2 to about 20% of a cross-linking agent containing a plurality of non-conjugated $CH_2=C<$ groups.

10. An amine oxide resin according to claim 9 wherein about 25% to about 65% of said functional groups are tertiary amine oxide groups.

11. A resin according to claim 1 wherein at least about 14.5% of said functional groups are tertiary amine oxide groups.

12. A resin according to claim 4 wherein about 100% of said functional groups are tertiary amine oxide groups.

13. A resin according to claim 11 wherein the matrix is a styrene-divinylbenzene matrix and the resin is a macroreticular resin.

14. A resin according to claim 12 wherein the resin is a macroreticular resin.

15. A method in which a liquid is treated with a cross-linked ion exchange resin matrix having a plurality of functional groups attached thereto to remove from the liquid a component thereof, said component having a negative charge, said functional groups being selected from aliphatic or non-heterocyclic aromatic tertiary amine oxide groups and aliphatic or non-heterocyclic aromatic tertiary amine groups wherein at least about 5% to 100% of said functional groups are tertiary amine oxide groups, and wherein said tertiary amine oxide groups have the formula

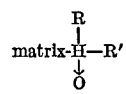

wherein R and R' are the same or different alkyl, aryl, alkaryl, or aralkyl groups, or wherein R and R' can be taken together to form a saturated heterocyclic ring with the attached nitrogen atom, or wherein R or R' can be joined with an R or R' in another tertiary amine oxide or tertiary amine group through an alkylene or alkyleneamino chain, and wherein said tertiary amine groups have the formula

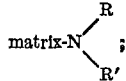

wherein R and R' are as defined above.

16. A process for stabilizing an ion-exchange or adsorbent resin having functional tertiary amine groups, said process comprising oxidizing a cross-linked polymeric resin matrix having a plurality of aliphatic or non-heterocyclic aromatic tertiary amine functional groups under reaction conditions capable of converting from 5% to 100% of said functional amine groups to functional tertiary amine oxide groups.

17. A process according to claim 16 wherein the oxidation is carried out using a peroxide.

18. A process according to claim 17 wherein the peroxide is aqueous hydrogen peroxide, and at least about 14.5% of the functional amine groups are converted to tertiary amine oxide groups, and further wherein the peroxide is present in an amount of up to about 3 moles of peroxide for each mole of tertiary amine group, the amount of peroxide being sufficient relative to the quantities of starting cross-linked polymeric resin to convert the tertiary amine functional groups to the desired amount of amine oxide form.

References Cited

Fieser & Feiser, "Organic Chemistry," Heath & Co., Boston, 1950 (pp. 235–36).

MELVIN GOLDSTEIN, Primary Examiner

U.S. Cl. X.R.

210—37; 260—601 R, 606, 621 A, 643 F

UNITED STATES PATENT OFFICE
CERTIFICATE OF CORRECTION

Patent No. 3,749,684　　　　　　　　　　Dated July 31, 1973

Inventor(s) Robert Winn Walker

It is certified that error appears in the above-identified patent and that said Letters Patent are hereby corrected as shown below:

In Column 9, under Example 4, in line 1, 50 g. should read 150 g.

Signed and sealed this 2nd day of April 1974.

(SEAL)
Attest:

EDWARD M. FLETCHER, JR.　　　　　　　　C. MARSHALL DANN
Attesting Officer　　　　　　　　　　　Commissioner of Patents